US011070446B2

(12) United States Patent
Shaw et al.

(10) Patent No.: US 11,070,446 B2
(45) Date of Patent: Jul. 20, 2021

(54) INTELLIGENT NETWORK RESOURCE ORCHESTRATION SYSTEM AND METHOD FOR INTERNET ENABLED DEVICE APPLICATIONS AND SERVICES

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 169 days.

(21) Appl. No.: 15/791,647

(22) Filed: Oct. 24, 2017

(65) Prior Publication Data

US 2019/0123978 A1    Apr. 25, 2019

(51) Int. Cl.
*G06F 15/173* (2006.01)
*H04L 12/24* (2006.01)
(Continued)

(52) U.S. Cl.
CPC ...... *H04L 41/5019* (2013.01); *H04L 41/5003* (2013.01); *H04L 41/5054* (2013.01);
(Continued)

(58) Field of Classification Search
CPC ............ H04L 41/5019; H04L 41/5003; H04L 41/5067; H04L 67/1004; H04L 67/322; H04L 69/24; G06F 9/5038
(Continued)

(56) References Cited

U.S. PATENT DOCUMENTS 7,480,734 B1 *  1/2009  Thakur .............. H04L 67/1097
                                                          709/226
7,747,240 B1 *  6/2010  Briscoe ................. H04L 12/14
                                                          370/238
(Continued)

FOREIGN PATENT DOCUMENTS

CN        105247819 A    1/2016
GB         2537842 A    11/2016
(Continued)

OTHER PUBLICATIONS

Yee Jiun Song, Marcos K. Aguilera, Ramakrishna Kotla, and Dahlia Malkhi. 2009. RPC chains: efficient client-server communication in geodistributed systems. In Proceedings of the 6th USENIX symposium on Networked systems design and implementation (NSDI'09). USENIX Association, USA, 277-290. (Year: 2009).*

(Continued)

*Primary Examiner* — Taylor A Elfervig
(74) *Attorney, Agent, or Firm* — BakerHostetler

(57) ABSTRACT

The functionality of Internet enabled devices, also referred to as Internet of Things (IoT) devices, is dependent upon network connectivity with application servers hosted in the cloud. The disclosed Internet enabled device application service chaining orchestrator (Orchestrator) may manage application servers according to application server parameters and may assist a network in managing communications between Internet enabled devices and their respective application servers in the cloud. The application server parameters for a particular application server may be assigned based on the IoT device that the particular application server supports (e.g., the device capabilities or network performance requirements). Exemplary application server parameters may include Industry Vertical (IV), which may be a designation for an industry or technical field that the IoT device and the application server supports. Each IV may (Continued)

include multiple Class of Service (CoS) (e.g., CoS1, CoS2, CoS3 . . . CoSn), which may be relative to each other or absolute. In addition, each CoS may include multiple service level agreements (SLA) (e.g., platinum, gold, silver), which may also be relative to each other or absolute. The application server parameters assigned to each application server may be stored in a database accessible by the Orchestrator. The Orchestrator may receive a message, identify at least one application server of a plurality of application servers based on the message, and identify application server parameters for the at least one application server. The Orchestrator may also assign one or more network communication parameters to the message based on the application server parameters for the at least one application server and cause a network to manage communications between an Internet enabled device and the at least one application server in accordance with the one or more network communication parameters.

20 Claims, 12 Drawing Sheets

(51) Int. Cl.
  *H04L 29/08* (2006.01)
  *H04L 29/06* (2006.01)
  *G06F 9/50* (2006.01)
(52) U.S. Cl.
  CPC ...... *H04L 41/5067* (2013.01); *H04L 67/1004* (2013.01); *H04L 67/322* (2013.01); *H04L 69/24* (2013.01); *G06F 9/5038* (2013.01); *H04L 41/5096* (2013.01)
(58) Field of Classification Search
  USPC .......................................................... 709/226
  See application file for complete search history.

(56) References Cited

U.S. PATENT DOCUMENTS

| | | | |
|---|---|---|---|
| 8,903,884 B2 | 12/2014 | Vasters et al. | |
| 9,015,306 B2 | 4/2015 | Dupre et al. | |
| 9,270,736 B2 | 2/2016 | Luciw | |
| 9,326,185 B2 | 4/2016 | Alisawi | |
| 9,344,835 B2 | 5/2016 | Chou | |
| 9,373,243 B2 | 6/2016 | Martin | |
| 9,407,542 B2 | 8/2016 | Vasseur | |
| 9,460,109 B1* | 10/2016 | Hagerman | G06F 8/71 |
| 9,516,129 B2 | 12/2016 | Luna et al. | |
| 9,549,304 B2 | 1/2017 | Grube | |
| 9,622,109 B2 | 4/2017 | Li et al. | |
| 9,626,183 B1 | 4/2017 | Smith et al. | |
| 9,853,898 B1* | 12/2017 | Subramanian | H04L 45/745 |
| 2003/0087649 A1* | 5/2003 | Bhatia | H04W 4/02 455/456.1 |
| 2005/0007993 A1* | 1/2005 | Chambers | H04L 12/66 370/349 |
| 2009/0066564 A1* | 3/2009 | Burroughs | H04W 24/10 342/357.4 |
| 2009/0190518 A1* | 7/2009 | Kim | H04L 12/189 370/312 |
| 2010/0046410 A1* | 2/2010 | So | H04L 12/189 370/312 |
| 2010/0242055 A1* | 9/2010 | Aguilera | G06F 9/547 719/330 |
| 2011/0173108 A1 | 7/2011 | Rajasekar et al. | |
| 2012/0278454 A1 | 11/2012 | Stewart et al. | |
| 2014/0359131 A1 | 12/2014 | Seed et al. | |
| 2015/0033312 A1 | 1/2015 | Seed et al. | |
| 2015/0055557 A1 | 2/2015 | Dong et al. | |
| 2015/0242884 A1* | 8/2015 | Goodman | G06Q 30/0246 705/14.45 |
| 2016/0007138 A1 | 1/2016 | Palanisamy et al. | |
| 2016/0085594 A1 | 3/2016 | Wang et al. | |
| 2016/0088049 A1 | 3/2016 | Seed et al. | |
| 2016/0094663 A1 | 3/2016 | Seed et al. | |
| 2016/0119434 A1 | 4/2016 | Dong et al. | |
| 2016/0127889 A1 | 5/2016 | Cui et al. | |
| 2016/0156527 A1 | 6/2016 | Ha et al. | |
| 2016/0212227 A1 | 7/2016 | Berarducci et al. | |
| 2016/0294643 A1* | 10/2016 | Kim | H04L 67/16 |
| 2016/0294819 A1 | 10/2016 | Salmela et al. | |
| 2016/0301779 A1 | 10/2016 | Cui et al. | |
| 2016/0344841 A1 | 11/2016 | Wang et al. | |
| 2016/0352634 A1* | 12/2016 | Itsumi | H04L 47/822 |
| 2016/0381146 A1 | 12/2016 | Zhang et al. | |
| 2018/0139274 A1* | 5/2018 | Gandhi | H04L 65/104 |

FOREIGN PATENT DOCUMENTS

| | | |
|---|---|---|
| KR | 2014-0074357 A | 6/2014 |
| WO | WO 2013/075490 A1 | 5/2013 |
| WO | WO 2014/058113 A1 | 4/2014 |
| WO | WO 2016/020726 A1 | 2/2016 |
| WO | WO 2016/172484 A1 | 10/2016 |
| WO | WO 2016/011373 A8 | 1/2017 |

OTHER PUBLICATIONS

Andrew D. Birrell. 1985. Secure communication using remote procedure calls. ACM Trans. Comput. Syst. 3, 1 (Feb. 1985), 1-14. (Year: 1985).*

S. Lee and M. Shin, "A self-recovery scheme for service function chaining," 2015 International Conference on Information and Communication Technology Convergence (ICTC), Jeju, Korea (South), 2015, pp. 108-112, (Year: 2015).*

Inam et al. "Towards automated service-oriented lifecycle management for 5G networks"; IEEE 20th Conf. Emerging Technologies & Factory Automation; 2015; 8 pages.

Kovatsch et al.; "Moving Application Logic from the Firmware to the Cloud: Towards the Thin Server Architecture for the Internet of Things"; IEEE 6th Int'l Conf. Innovative Mobile and Internet Services in Ubiquitous; 2012; 6 pages.

Konsek, Henryk; "The Architecture of IoT Gateways"; DZone; https://dzone.com/articles/iot-gateways-and-architecture; Aug. 2015; 12 pages.

Hendrick, Stephen; "Why Gateways and Controllers Are Critical for IoT Architecture"; http://web.archive.org/web/20160910085800/https://www.rtinsights.com/why-gateways-and-controllers-are-critical-for-iot-architecture/; RTInsights.com; 2016; 5 pages.

Gupta et al.; "iFogSim: A Toolkit for Modeling and Simulation of Resource Management Techniques in Internet of Things, Edge and Fog Computing Environments"; Cloud Computing and Distributed Systems; 2016; 22 pages.

Guinard et al.; "5 From the Internet of Things to the Web of Things: Resource Oriented Architecture and Best Practices"; Architecture the Internet of Things; 2011; 33 pages.

Cubo et al.; "A Cloud-Based Internet of Things Platform for Ambient Assisted Living"; Sensors; vol. 14, 2014; p. 14070-14105.

"IoT gateways on Ubuntu"; http://web.archive.org/web/20161107220025/https://www.ubuntu.com/internet-of-things/gateways; 2016; 5 pages.

* cited by examiner

INTELLIGENT NETWORK RESOURCE ORCHESTRATION SYSTEM AND METHOD FOR INTERNET ENABLED DEVICE APPLICATIONS AND SERVICES

TECHNICAL FIELD

This disclosure relates generally to network communications, and more particularly, to an Internet enabled device application service chaining orchestrator to assist a network in managing communications between Internet enabled devices (e.g., Internet of Things (IoT) devices) and their respective application servers in the cloud.

BACKGROUND

Current Internet enabled devices, also referred to as Internet of Things (IoT) devices, include a wide range of diverse products from sprinklers, household appliances, utility meters, and personal fitness trackers to fully autonomous vehicles. The functionality of the IoT devices is dependent upon network connectivity with application servers hosted in the cloud. The number of IoT devices continues to increase and it is envisioned that there will be billions of IoT devices. To support the billions of IoT devices, the number of application servers may number in the millions. Networks, including mobility networks, currently handle transmissions between IoT devices and application servers as equal, with no distinction between the different application servers or the IoT devices' capabilities or requirements. As the number and complexity of IoT devices increases, the sheer volume of network traffic for delivering IoT services will impose significant, if not impossible, challenges for networks, especially during peak hours.

SUMMARY

The disclosed systems and methods may allow for an Internet enabled device application service chaining orchestrator to assist a network in managing communications between Internet enabled devices (e.g., Internet of Things (IoT) devices) and their respective application servers in the cloud. In an example, a method may include receiving a message, identifying at least one application server of a plurality of application servers based on the message, and identifying application server parameters for the at least one application server. The method may also include assigning one or more network communication parameters to the message based on the application server parameters for the at least one application server, and causing a network to manage communications between an Internet enabled device and the at least one application server in accordance with the one or more network communication parameters.

In another example, the method may also include one of adding application server parameters for a new application server, deleting application server parameters for an old application server, and modifying application server parameters for an existing application server.

In another example, the message may comprise a server message from the at least one application server and the step of causing the network to manage communications between the Internet enabled device and the at least one application server further comprises sending the server message via the network to the Internet enabled device. The network communication parameters may comprise at least one of Policy, Charging, and Quality of Service (QoS).

In another example, the message may comprise a device message from the Internet enabled device, where the device message includes at least one of an identifier for the Internet enabled device and an identifier for the at least one application server. The one or more network communication parameters may comprise a priority for the device message, and the step of causing the network to manage communications between the Internet enabled device and the at least one application server may further comprise sending the device message to the at least one application server based on the priority.

In another example, a system may include a processor and a memory for storing instructions that cause the processor executing the instructions to effectuate operations. The operations may include receiving a message, identifying at least one application server of the plurality of application servers based on the message, and identifying application server parameters for the at least one application server. Other operations may include assigning one or more network communication parameters to the message based on the application server parameters for the at least one application server, and causing a network to manage communications between an Internet enabled device and the at least one application server in accordance with the one or more network communication parameters.

In another example, operations may further comprise one of adding application server parameters for a new application server, deleting application server parameters for an old application server, and modifying application server parameters for an existing application server.

In another example, the message may comprise a server message from the at least one application server and the causing the network to manage communications between the Internet enabled device and the at least one application server operation may further comprise sending the server message via the network to the Internet enabled device. The network communication parameters may comprise at least one of Policy, Charging, and Quality of Service (QoS).

In another example, the message may comprise a device message from the Internet enabled device, where the device message includes at least one of an identifier for the Internet enabled device and an identifier for the at least one application server. The one or more network communication parameters may comprise a priority for the device message, and the causing the network to manage communications between the Internet enabled device and the at least one application server operation may further comprise sending the device message to the at least one application server based on the priority.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described methods and systems for an Internet enabled device application service chaining orchestrator are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

DETAILED DESCRIPTION OF ILLUSTRATIVE EMBODIMENTS

Figure 1A:
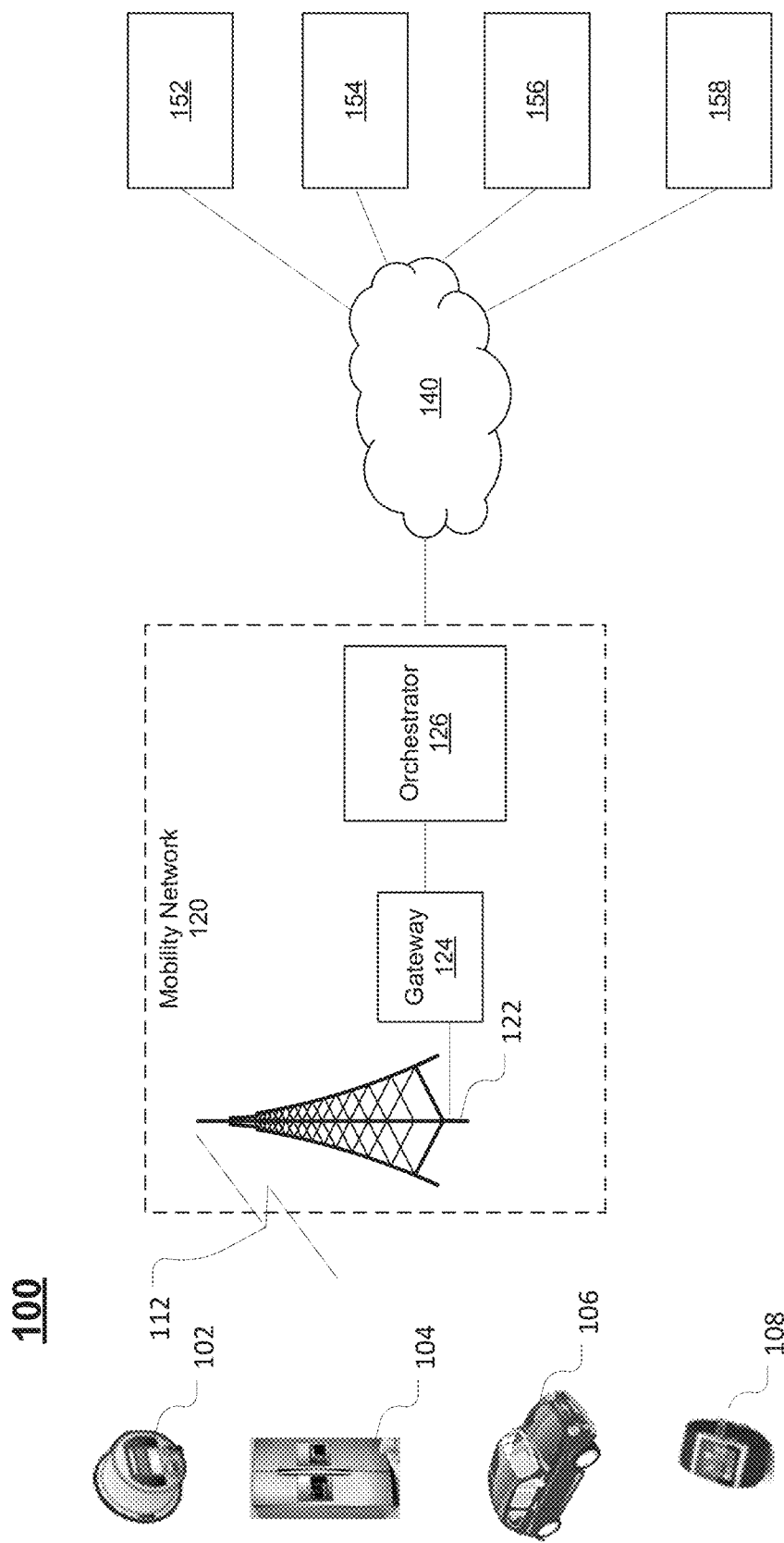
FIG. 1A is a representation of an exemplary network configuration utilizing an Internet enabled device application service chaining orchestrator in accordance with the present disclosure.

Disclosed herein are methods and systems for an Internet enabled device application service chaining orchestrator (Orchestrator) that may manage a plurality of application servers according to application server parameters. The plurality of application servers may be hosted in the cloud and configured to support and provide services for a plurality of Internet enabled devices, also referred to herein as Internet of Things (IoT) devices. The application server parameters may include Industry Vertical (IV), which may be a designation for an industry or technical field that the IoT device and the application server supports. Exemplary IV may include healthcare (e.g., health monitoring equipment, diagnostic equipment, or the like), transportation (e.g., Federal Express, trucking, autonomous vehicles, or the like), utility meters (e.g., electric, gas, water, or the like), and home automation (e.g., thermostat, switches, lighting, door locks, lawn sprinkler, appliances, or the like). Each IV may include multiple Class of Service (CoS) (e.g., CoS1, CoS2, CoS3 . . . CoSn), which may be relative to each other or absolute. In addition, each CoS may include multiple service level agreements (SLA) (e.g., platinum, gold, silver), which may also be relative to each other or absolute.

In one aspect, the application server parameters for a particular application server may be selected or assigned based on the IoT device that the particular application server supports. For example, the application server parameters may correlate to generic network performance metrics (e.g., bandwidth, throughput, latency, jitter, error rate, reliability, security, or the like) and/or pricing for network services (e.g., different tiers of network services). The application server parameters may be selected or assigned based on the IoT device capabilities or network performance requirements. The application server parameters may also be selected or assigned based on pricing (e.g., an entity operating an application server may elect to pay more for a higher tier of network services).

In one aspect, the application server parameters selected or assigned to each application server may be mapped to network communication parameters (e.g., Quality of Service (QoS), Policy, Charging, and the like) and the collective set of parameters for each application server may be stored in a database accessible by the Orchestrator. In another aspect, the application server parameters may mapped to network communication parameters to create a lookup table that correlates application server parameters to network communication parameters. The application server parameters selected or assigned to each application server may be stored in a database accessible by the Orchestrator. During operation, the Orchestrator may retrieve the application server parameters for a particular application server from the database and use the lookup table to identify the corresponding network communication parameters.

By selecting or assigning different application server parameters and correlating network communication parameters, it may be possible to distinguish one application server from another. As a result, the Orchestrator may assist a network in managing communications between IoT devices and their respective application servers in the cloud. For example, an IoT device that is part of an autonomous vehicle may have different network performance requirements (e.g., bandwidth, throughput, latency, jitter, error rate, reliability, security, or the like) versus an Internet enabled household appliance. As discussed below, the Orchestrator may assist and enable a network to manage communications to and from the autonomous vehicle IoT device differently than the Internet enabled household appliance. When this practice is extended to the numerous Internet enabled devices that may be operating on the network, the Orchestrator may allow the network to more efficiently manage Internet enabled device network traffic to avoid or mitigate a congested network or network overload.

In another aspect, the Orchestrator is a logical entity, which may stand alone or be integrated with a network or cloud management entity. By way of example, the Orchestrator may be instantiated in a network (e.g., integrated with a network gateway or as a virtual network function (VNF) operating on general purpose computing hardware), in the cloud, or in a gateway that is between the cloud and a network.

FIG. 1A illustrates an exemplary system 100 where Orchestrator 126 is instantiated as an edge entity in a mobility network 120. System 100 includes user endpoint (UE) devices 102, 104, 106, 108, mobility network 120, and application servers 152, 154, 156, 158 that are hosted in the cloud network 140 (e.g., Internet). UEs may include any appropriate type of user equipment, such as a mobile phone, a computing tablet, and an IoT device. Exemplary IoT devices include utility meter 102, appliance 104, autonomous vehicle device 106, and fitness tracker 108. By way of example, the UE may be a remote monitoring application running on a mobile phone that sends commands to, and receives information from, an IoT device application server in the cloud. In another example, the UE may be utility meter 102 that sends commodity usage information (e.g., electricity, gas, water) to a utility company application server in the cloud. It is contemplated herein that the various UEs may be configured with the necessary communication interfaces to interact with various types of access networks (e.g., mobility network 120, satellite, broadband, Wi-Fi, or the like). The UE may be a device that communicates via a machine-two machine (M2M) communication interface or it may be in device to be used via a human-machine interface. It is to be understood that the UEs depicted in FIG. 1A are only examples and not intended to be limiting.

With continued reference to FIG. 1A, UE 102, 104, 106, 108 are configured to establish a wireless connection with mobility network 120 via air interface 112 and base station 122. Mobility network 120 may be a 4G Long Term Evolution (LTE) network, a 5G network, or the like. An exemplary 4G Long Term Evolution-Evolved Packet System (LTE-EPS) network architecture is discussed below with reference to FIG. 4. In addition, a 5G network is discussed with reference to FIGS. 2A and 2B.

As illustrated in FIG. 1A, mobility network 120 may include a gateway 124 that is communicatively coupled to Orchestrator 126. In a 4G network, gateway 124 may comprise a serving gateway (SGW) and/or a packet data network (PDN) gateway (PGW). In a 5G network, gateway 124 may comprise a management gateway (MGW). Mobility network 120 is connected to external network 140 (e.g., Internet) that hosts application servers 152, 154, 126, 158. Application servers 152, 154, 156, 158 may be configured to support and provide services for UE devices 102, 104, 106, 108.

Figure 1B:
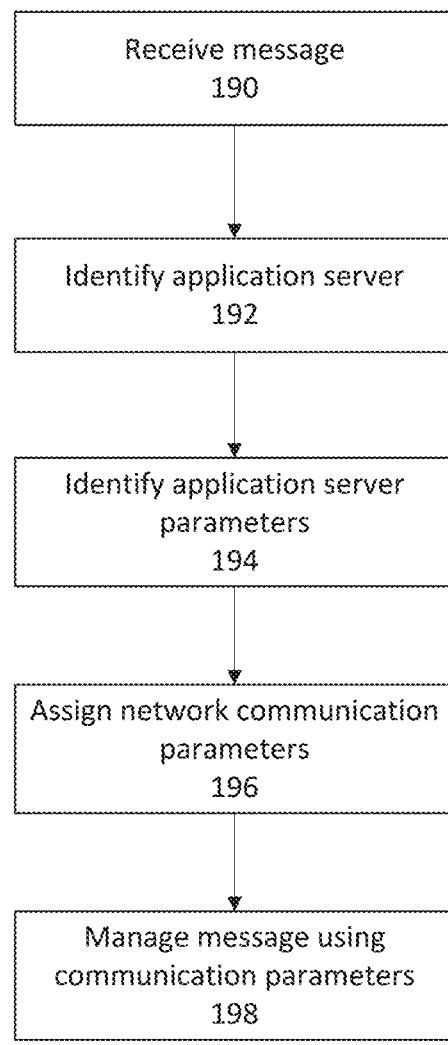
FIG. 1B is an exemplary flow diagram illustrating a method of implementing an Internet enabled device application service chaining orchestrator.

FIG. 1B illustrates a flow chart of an exemplary method for providing an Internet enabled device application service chaining Orchestrator in accordance with the present disclosure. FIG. 1B shall be discussed in connection with two exemplary scenarios: 1) an "egress" or outgoing message, where the message originates in the mobility network and is sent to an application server in the cloud; and 2) and "ingress" or incoming message where the message originates in an external network and is sent to an IoT device on the mobility network.

With reference to FIGS. 1A and 1B, application server parameters may be selected or assigned based on a type of Internet enabled device. For example, application server 156 may provide services for autonomous vehicle device 106. Application server 156 may be assigned an IV corresponding to autonomous vehicles, a CoS of CoS3, and a SLA of gold based on the capabilities or network performance requirements for autonomous vehicle device 106. It is contemplated herein that the application server parameters may include any combination of IV, CoS and SLA. For example, the same autonomous vehicle may also include autonomous vehicle device 106' (not shown) that receives services from application server 156' (not shown). Application server 156' may be assigned an IV corresponding to autonomous vehicles, a CoS of Cost, and an SLA of platinum based on the capabilities or network performance requirements for autonomous vehicle device 106'. In another example, application server 154 may provide services for a household appliance device 104. Appliance device 104 may not require the same network resources or services as autonomous vehicle device 106 and/or the entity providing service for application device 104 may want to pay less for access to mobility network 120. Therefore, application server 154 may be assigned an IV corresponding to home automation, a CoS of CoS9, and an SLA of silver.

Continuing with the first example above, the application server parameters associated with application server 156 may be stored in a database. In addition, other information relating to the application server 156 may be stored in the database. Exemplary additional information may include a Uniform Resource Locator (URL), an Internet protocol (IP) address, and a Port Number associated with the application server 156. As described below, an Internet enabled device may require multiple application servers to fulfill the requested service. Accordingly, the additional information may include multiple URLs, IP addresses, and Port Numbers that correspond to the relevant application servers. The additional information may also include an order in which the multiple application servers perform their respective portion of the requested services. In a software defined network (SDN) implementation (e.g., 5G network), the additional information may include the identification of a network "slice" associated with the IoT device, the application server, or one or more of the application server parameters (e.g., the IV).

In the first exemplary scenario above ("egress" message), autonomous vehicle device 106 sends a request for service from application server 156 hosted in cloud network 140. In this example, the device request message is routed through the mobility network 120 and received and cued at Orchestrator 126. For example, autonomous vehicle device 106 may send the device message via air interface 112, base station 122, and gateway 124. Gateway 124 (e.g. SGW, PGW, MGW, or the like) may query a device profile database (e.g. home subscriber server (HSS), or the like) that may identify the message as an IoT communication and trigger the network to consult with the Orchestrator 126.

At step 190, Orchestrator 126 may receive the device request message and collect information from the device request message. For example, Orchestrator 126 may parse the message for information such as a device identifier for autonomous vehicle device 106 (e.g. IP address, serial number, software/firmware version, International Mobile Equipment Identity (IMEI), or the like) and/or an application server identifier for application server 156 (e.g., the uniform resource locator (URL), IP address, Port Number of application server 156).

At step 192, Orchestrator 126 may identify application server 156 based on the device request message. For example, Orchestrator 126 may access a database and map the URL parsed from the device request message to application server 156. At step 194, the Orchestrator may identify application server parameters assigned to application server 156. For example, Orchestrator 126 may access a database and retrieve the application server parameters associated with application server 156 (e.g., IV corresponding to autonomous vehicles, CoS of CoS3, and SLA of gold).

At step 196, Orchestrator 126 may identify and assign network communication parameters to the device request message based on the application server parameters for application server 156. At this step, Orchestrator 126 may access the database and retrieve network communication parameters that were stored for application server 156. Alternatively, Orchestrator 126 may retrieve the application server 156 application server parameters and use a lookup table to correlate the retrieved application server parameters to network communication parameters. In this scenario, an exemplary network communication parameter may include a response time for gateway 124 to send the device request message to external network 140, a priority to assign to the device service request message that may prioritize how the device request message is sent from the mobility network 120 to cloud network 140, and/or a QoS. At step 196, Orchestrator 126 or a network component (e.g., gateway 124) may modify the device request message to include the network communication parameters.

At step 198, mobility network 120 may send the device request message to application server 156 in cloud network 140 based on the assigned network communication parameters. For example, mobility network may process the device request message in accordance with the mobility network's standard procedures (e.g., gateway 124 may send the message to external network 140 based on a priority or response time assigned to the device request message).

In the second exemplary scenario ("ingress" message), application server 156 sends a message to autonomous vehicle device 106, which is able to access cloud network 140 via mobility network 120. In this example, the message from application server 156 is received in mobility network 120 by gateway 124. Gateway 124 (e.g. SGW, PGW, MGW, or the like) may query a device profile database (e.g. home subscriber server (HSS), or the like) that may identify the message as an IoT communication and trigger the network to consult with the Orchestrator 126.

At step 190, Orchestrator 126 may receive and collect information from the message that may be used to identify the application server (e.g., application server 156). For example, Orchestrator 126 may parse the message for information such as the application server IP address.

At step 192, the Orchestrator may identify application server 156 based on the application server message. For example, Orchestrator 126 may access a database and use the information collected in step 190 to identify the application server (e.g., map the IP address parsed from the application server message to identify application server 156). At step 194, the Orchestrator may identify application server parameters assigned to the application server 156. For example, Orchestrator 126 may access a database and retrieve the application server parameters associated with application server 156 (e.g., IV corresponding to autonomous vehicles, CoS of CoS3, and SLA of gold).

At step 196, Orchestrator 126 may identify and assign network communication parameters to the message based on the application server parameters for application server 156. For example, Orchestrator 126 may access a database and retrieve network communication parameters associated with application server 156. In another example, Orchestrator 126 may use the application server parameters retrieved in step 194 to reference a lookup table that correlates the retrieved application server parameters to network communication parameters. Exemplary network communication parameters may include Quality of Service (QoS), Policy, and Charging. At this step, Orchestrator 126 or a network component (e.g., gateway 124) may modify the device request message to include the network communication parameters. As alluded to above, in a software defined network (SDN) implementation that utilizes network slicing, Orchestrator 126 may retrieve information that identifies a particular network slice for the message.

At step 198, mobility network 120 may send the application server message to autonomous vehicle device 106 based on the assigned network communication parameters. For example, mobility network 120 may process and send the application server message to UE 106 via gateway 124, base station 122, and air interface 112. In the SDN example, mobility network 120 may also associate the message with a particular network slice.

In another aspect, an application that provides services for an IoT device may require support from multiple application servers. In such an event, application servers may be chained together to collectively fulfill the services. Each of the individual application servers may have different application server parameters and network communication parameters such that the individual application servers are chained together to perform the requested services sequentially, concurrently, or as a combination of sequential and concurrent operations. The Orchestrator may map a hierarchy for the multiple application servers (e.g., parent, child) to control how the network sends messages to each of the respective application servers.

For example, the application servers may be chained together to perform individual portions of the requested services sequentially. In this example, a message may be sent to a first application server in a chain and after the first application server performs its portion of the requested services, a message may be sent to the next application server in the chain to perform its portion of the requested services. The process may be repeated until all the application servers in the chain have performed their respective portions of the services and the requested services have been fulfilled. In another example, the application servers may perform individual portions of the requested services concurrently. In this example, a message may be sent to each of the application servers at the same time or at designated time intervals based on the respective network communication parameters.

Referring to FIG. 1A, in an example service chaining scenario, an application for UE 108 may require support from application servers 158, 156, and 154 to provide requested services. At step 190, Orchestrator 126 may receive a request message from UE 108 and collect information from the request message. In this scenario, the information may include application server identifiers for application servers 158, 156, and 154 (e.g., URLs for each application server) and a service chaining order for the servers to perform their respective portion of the requested services sequentially (e.g., 158→156→154).

At step 192, Orchestrator 126 may access a database and identify application servers 158, 156, and 154 from the information collected in step 190. At step 194, Orchestrator 126 may access a database and retrieve application server parameters for application servers 158, 156, and 154. At step 196, Orchestrator 126 may identify and assign network communication parameters to each message to be sent based on the application server parameters for each of the respective application servers 158, 156, and 154. Continuing with the example above, Orchestrator 126 may retrieve or correlate network communication parameters for the first message (destined for application server 158), the second message (destined for application server 156), and the third message (destined for application server 154). By way of example, the first and second message may have the same priority and the third message may have a higher priority. At step 196, Orchestrator 126 or a network component (e.g., gateway 124) may modify the three messages to include the respective network communication parameters.

At step 198, mobility network 120 may send the messages to the respective application servers in cloud network 140 based on the assigned network communication parameters. For example, mobility network 120 may send the first message to application server 158. After the network receives notification that the application server 158 has completed its operation, network 120 may send the second message to application server 156. And after the network receives notification application server 156 is completed its operation, network 120 may send the third message to application server 154.

In another aspect, the Orchestrator may be configured to update the plurality of application servers hosted in the cloud. For example, the Orchestrator may add application server parameters for a new application server, delete application server parameters for an application server that is no longer in use, and modify application server parameters an existing application server. The Orchestrator may update the application server parameters for the application servers on a periodic basis (e.g., hourly, daily) or in real time as any additions, changes, or removals occur.

In another aspect, the Orchestrator may manage multiple access networks (e.g., mobility network, satellite, broadband, Wi-Fi, or the like). If an IoT device has access to multiple networks, the Orchestrator may be able to select the best network route for sending a message from the application server to the IoT device. For example, an IoT device may have multiple network connections that enable it to access the cloud and communicate with its respective application server via a mobility network and a Wi-Fi network. The Orchestrator may be able to route communications from an application server in the cloud to the IoT device by both networks. In the event that the mobility network is congested, overloaded or unable to satisfy the IoT device's network performance requirements, the Orchestrator may route communication via the Wi-Fi network. In another example, the Orchestrator may be in communication with the mobility network and have a separate connection to the Internet. In this example, the Orchestrator may be able to route the communication from the application server to the IoT device by the best route, which may not be the mobility network. In the event that the mobility network is congested, overloaded or unable to satisfy the IoT device's network performance requirements, the Orchestrator may send the message using the Internet connection whereby the IoT device may receive the message via another network (e.g., Wi-Fi network in the previous example).

Figure 2A:
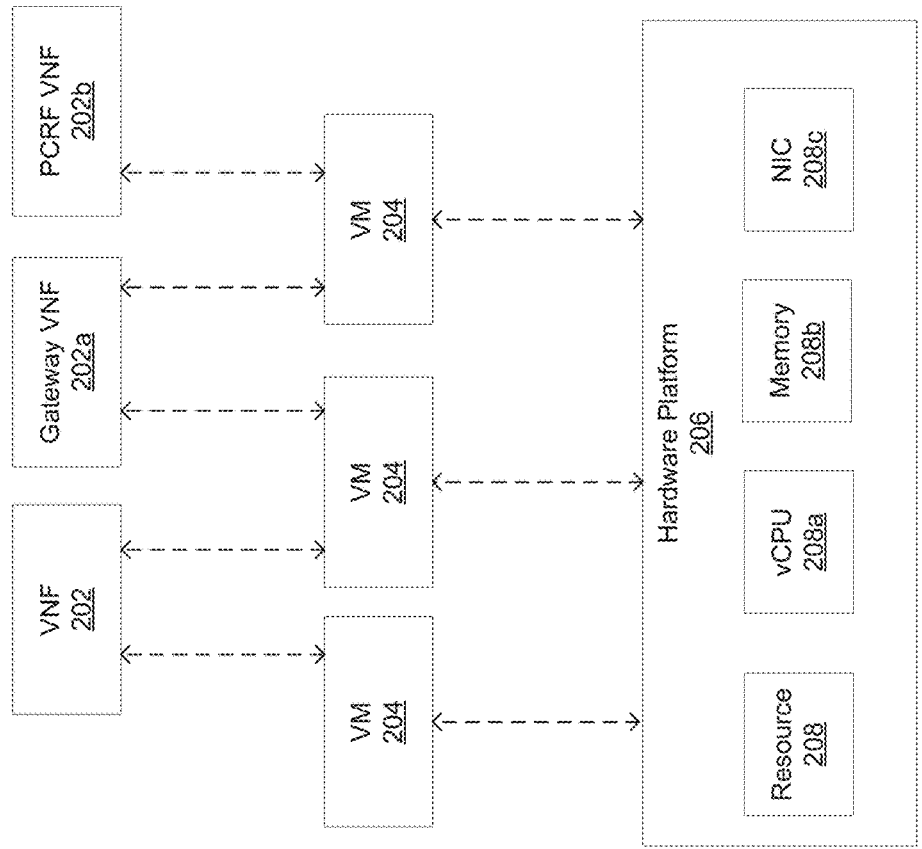
FIG. 2A is a representation of an exemplary software defined network.

FIG. 2A is a representation of an exemplary software defined network (SDN) 200. Communication networks have migrated from using specialized networking equipment executing on dedicated hardware, like routers, firewalls, and gateways, to SDNs executing as virtualized network functions (VNF) in a cloud infrastructure. To provide a service, a set of VNFs may be instantiated on general purpose hardware. Each VNF may require one or more virtual machines (VMs) to be instantiated. In turn, VMs may require various resources, such as memory, virtual computer processing units (vCPUs), and network interfaces or network interface cards (NICs). The general purpose hardware of SDN 200 may be configured to run virtual network elements to support communication services, such as mobility services, including consumer services and enterprise services. These services may be provided or measured in sessions.

Virtual network functions (VNFs) 202 may be able to support a limited number of sessions. Each VNF 202 may have a VNF type that indicates its functionality or role. For example, FIG. 2A illustrates a gateway VNF 202a and a policy and charging rules function (PCRF) VNF 202b. Additionally or alternatively, VNFs 202 may include other types of VNFs. Each VNF 202 may use one or more virtual machines (VMs) 204 to operate. Each VM 204 may have a VM type that indicates its functionality or role. Each VM 204 may consume various network resources from a hardware platform 206, such as a resource 208, a virtual central processing unit (vCPU) 208a, memory 208b, or a network interface card (NIC) 208c. Additionally or alternatively, hardware platform 206 may include other types of resources 208.

Figure 2B:
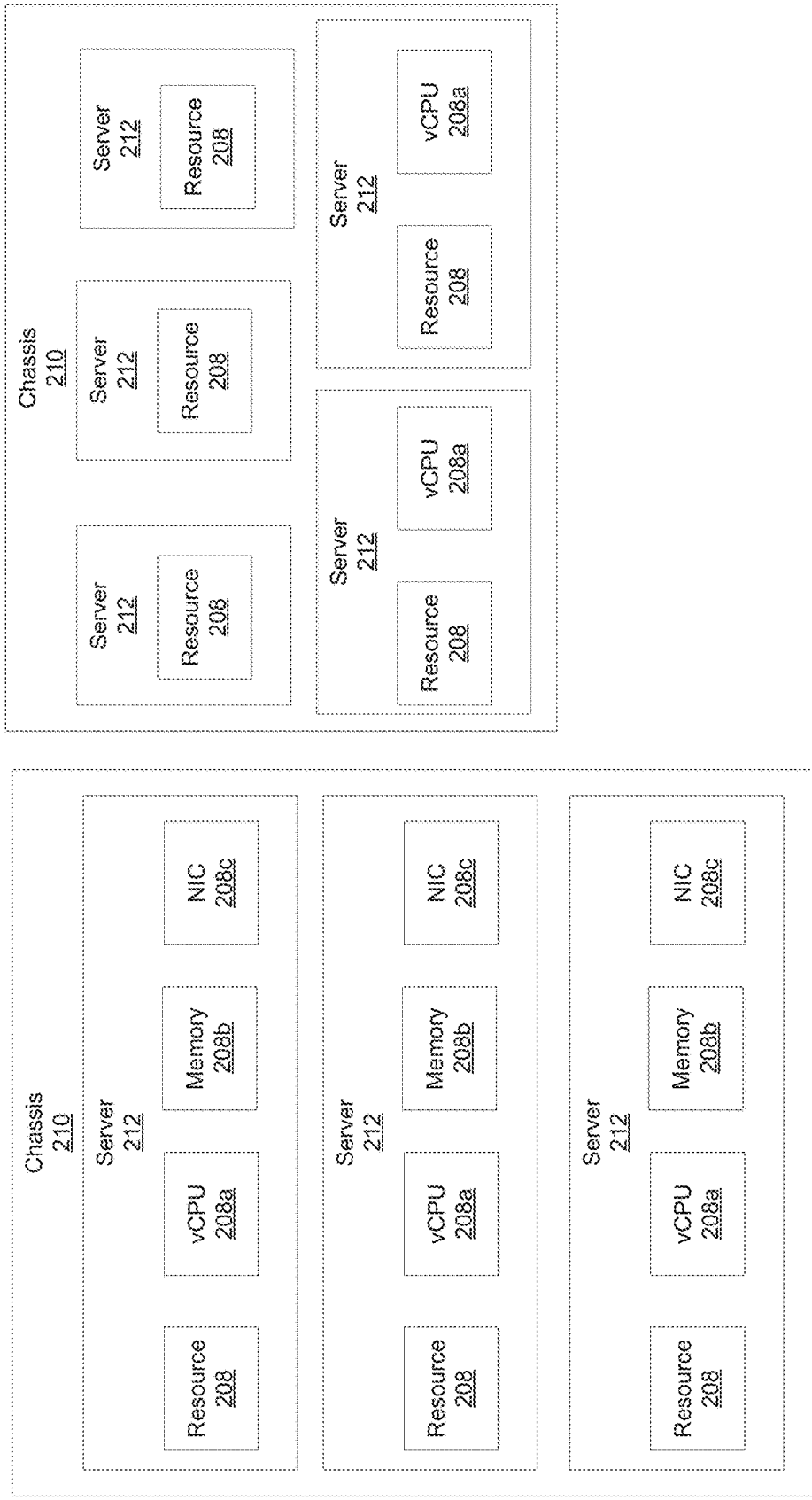
FIG. 2B is a representation of an exemplary hardware platform for a software defined network.

While FIG. 2A illustrates resources 208 as collectively contained in hardware platform 206, the configuration of hardware platform 206 may isolate, for example, certain memory 208c from other memory 208c. FIG. 2B provides an exemplary implementation of hardware platform 206.

Hardware platform 206 may comprise one or more chasses 210. Chassis 210 may refer to the physical housing or platform for multiple servers or other network equipment. In an aspect, chassis 210 may also refer to the underlying network equipment. Chassis 210 may include one or more servers 212. Server 212 may comprise general purpose computer hardware or a computer. In an aspect, chassis 210 may comprise a metal rack, and servers 212 of chassis 210 may comprise blade servers that are physically mounted in or on chassis 210.

Each server 212 may include one or more network resources 208, as illustrated. Servers 212 may be communicatively coupled together (not shown) in any combination or arrangement. For example, all servers 212 within a given chassis 210 may be communicatively coupled. As another example, servers 212 in different chasses 210 may be communicatively coupled. Additionally or alternatively, chasses 210 may be communicatively coupled together (not shown) in any combination or arrangement.

The characteristics of each chassis 210 and each server 212 may differ. For example, FIG. 2B illustrates that the number of servers 212 within two chasses 210 may vary. Additionally or alternatively, the type or number of resources 208 within each server 212 may vary. In an aspect, chassis 210 may be used to group servers 212 with the same resource characteristics. In another aspect, servers 212 within the same chassis 210 may have different resource characteristics.

Given hardware platform 206, the number of sessions that may be instantiated may vary depending upon how efficiently resources 208 are assigned to different VMs 204. For example, assignment of VMs 204 to particular resources 208 may be constrained by one or more rules. For example, a first rule may require that resources 208 assigned to a particular VM 204 be on the same server 212 or set of servers 212. For example, if VM 204 uses eight vCPUs 208a, 1 GB of memory 208b, and 2 NICs 208c, the rules may require that all of these resources 208 be sourced from the same server 212. Additionally or alternatively, VM 204 may require splitting resources 208 among multiple servers 212, but such splitting may need to conform with certain restrictions. For example, resources 208 for VM 204 may be able to be split between two servers 212. Default rules may apply. For example, a default rule may require that all resources 208 for a given VM 204 must come from the same server 212.

An affinity rule may restrict assignment of resources 208 for a particular VM 204 (or a particular type of VM 204). For example, an affinity rule may require that certain VMs 204 be instantiated on (e.g., consume resources from) the same server 212 or chassis 210. Affinity rules may restrict assignment of resources 208 based on the identity or type of resource 208, VNF 202, VM 204, chassis 210, server 212, or any combination thereof.

An anti-affinity rule may restrict assignment of resources 208 for a particular VM 204 (or a particular type of VM 204). In contrast to an affinity rule—which may require that certain VMs 204 be instantiated on the same server 212 or chassis 210—an anti-affinity rule requires that certain VMs 204 be instantiated on different servers 212 (or different chasses 210). Anti-affinity rules may restrict assignment of resources 208 based on the identity or type of resource 208, VNF 202, VM 204, chassis 210, server 212, or any combination thereof.

Within these constraints, resources 208 of hardware platform 206 may be assigned to be used to instantiate VMs 204, which in turn may be used to instantiate VNFs 202, which in turn may be used to establish sessions. The different combinations for how such resources 208 may be assigned may vary in complexity and efficiency. For example, different assignments may have different limits of the number of sessions that can be established given a particular hardware platform 206.

To solve the problem of determining a capacity (or, number of sessions) that can be supported by a given hardware platform 206, a given requirement for VNFs 202 to support a session, a capacity for the number of sessions each VNF 202 (e.g., of a certain type) can support, a given requirement for VMs 204 for each VNF 202 (e.g., of a certain type), a give requirement for resources 208 to support each VM 204 (e.g., of a certain type), rules dictating the assignment of resources 208 to one or more VMs 204 (e.g., affinity and anti-affinity rules), the chasses 210 and servers 212 of hardware platform 206, and the individual resources 208 of each chassis 210 or server 212 (e.g., of a certain type), an integer programming problem may be formulated.

However, given the complexity of the integer programming problem—the numerous variables and restrictions that must be satisfied—implementing an algorithm that may be used to solve the integer programming problem efficiently, without sacrificing optimality, may be difficult. U.S. application Ser. No. 15/363,511, filed on Nov. 29, 2016 and titled "Managing Physical Resources for Virtual Network Functions," the contents of which are incorporated herein in its entirety, discloses exemplary approaches to the integer programming problem to optimize the session capacity for the entire hardware platform 206.

Utilizing a SDN, next generation of mobility networks (e.g., 5G network) may also allow for the use of network slices. Network slices may be conceptualized as partitions in a network utilizing virtualization. With network slicing, one physical network is "sliced" into multiple virtual networks, which may each be architected and optimized for a specific requirement and/or specific application/service. A network slice may be a self-contained network segment in terms of operation and traffic flow and may have its own network architecture, engineering mechanisms and network provision. In addition, different slices may be isolated from one another in the control plane(s) and user plane(s). Accordingly, a network slice may behave as if it is an independent network, and may provide more flexible architecture for a service or group of clients supported by the network slice.

As suggested above, different devices utilizing 5G network services may present a variety of requests and specifications, with the complexity increasing as IoT device networks expand. The different resource demands or specifications may be accommodated in particular embodiments by dynamic network slicing. In 5G mobile networks, network slicing may allow telecom providers to design, deploy, and customize different "slices" of the network, running on a common network infrastructure. Each slice may have independent characteristics for delivering a particular service. Network slicing may allow telecom providers to offer networks on an as-a-service basis to meet the wide range of use cases. For example, in a single 5G network, network slicing technology may provide connectivity for smart meters with a network slice that connects IoT devices using a high reliability data-only service, with a given latency, data rate and security level. At the same time, slicing technology may provide another network slice that has greater throughput, greater data speeds, and lower latency for an autonomous vehicle IoT device.

Figure 3:
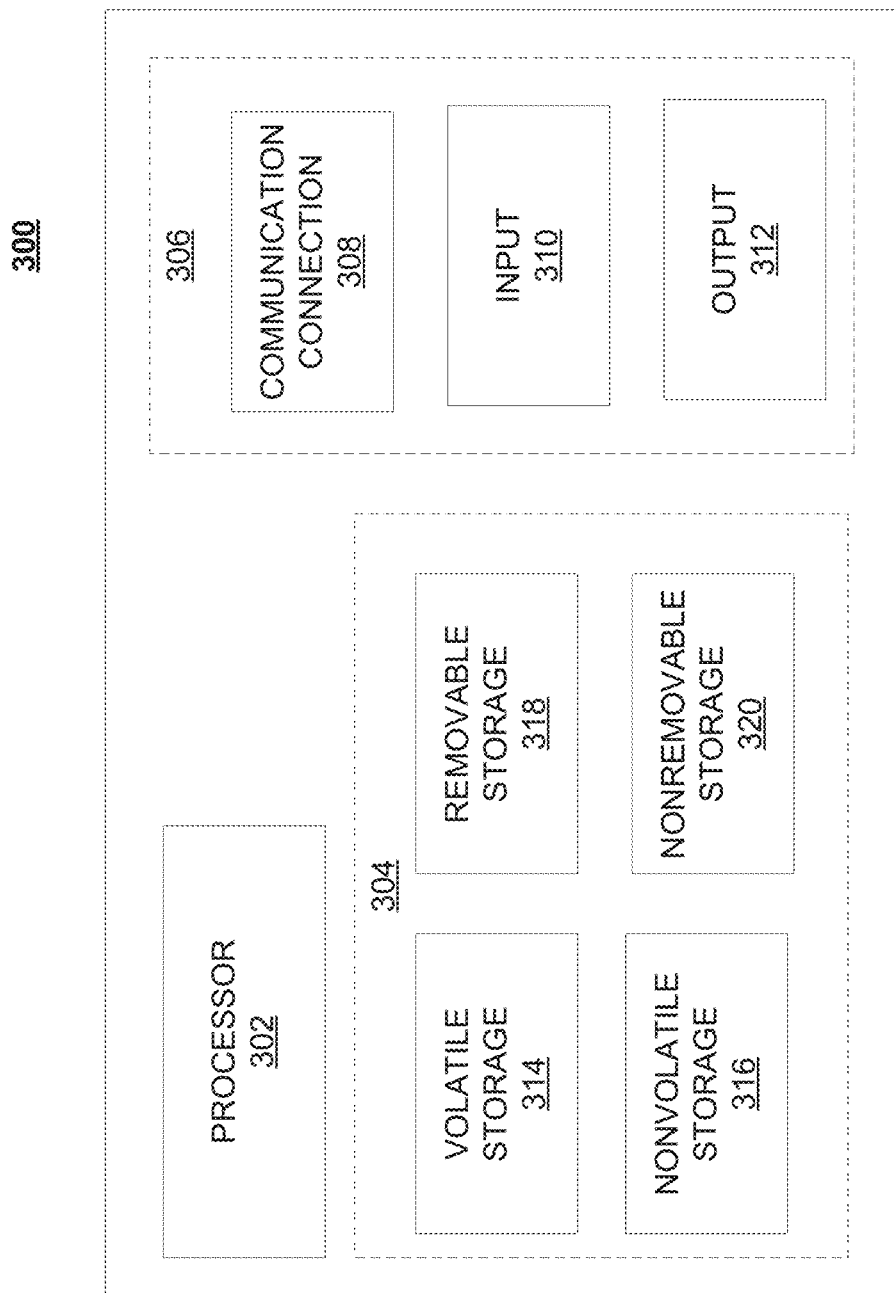
FIG. 3 is a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations comprising any one or more of the methods described herein or perform functions associated with telecommunications described herein. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing operations comprising any one or more of the methods described herein or functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Figure 4:
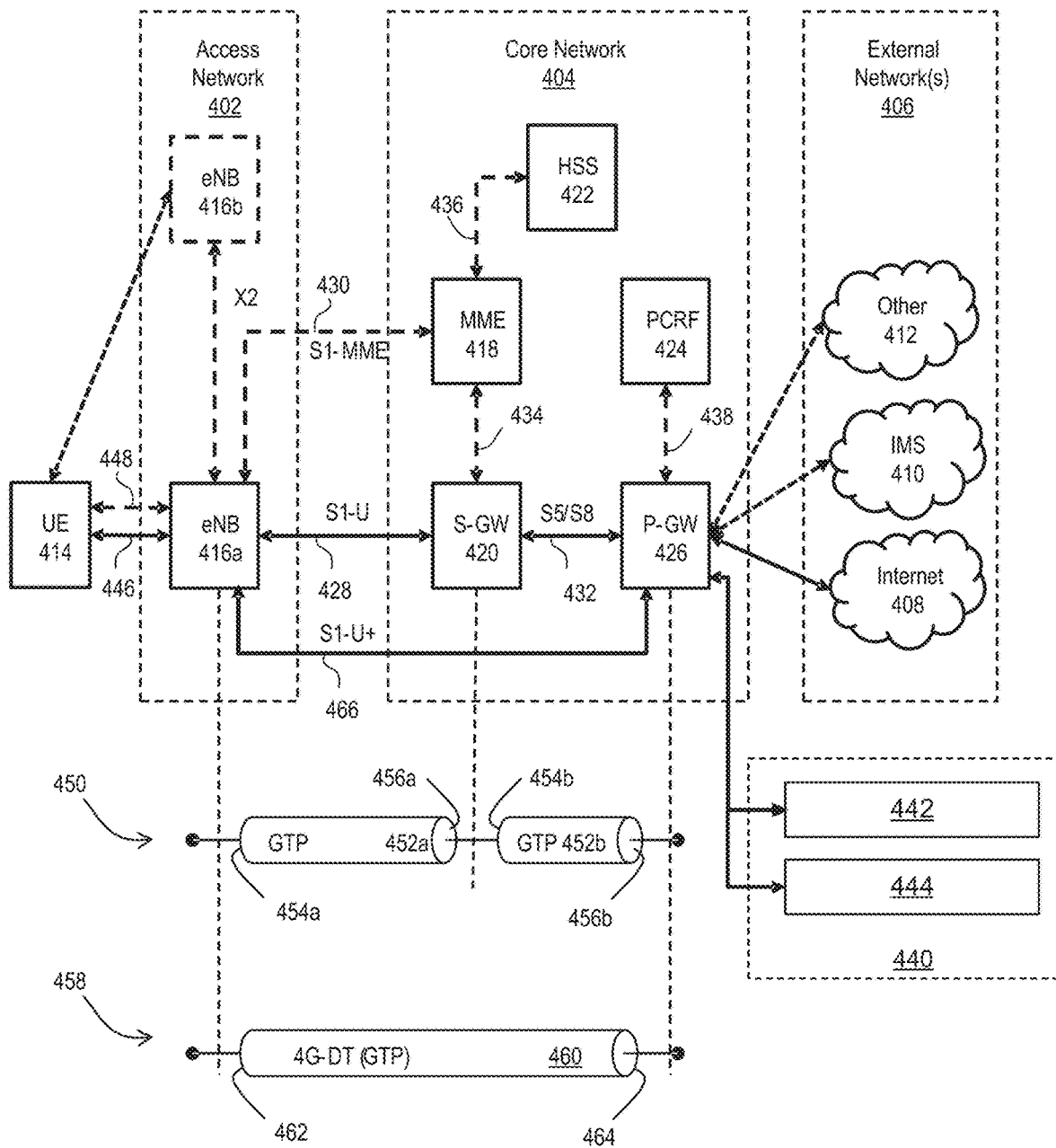
FIG. 4 is a functional block diagram depicting one example of a Long Term Evolution-Evolved Packet System (LTE-EPS) network architecture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations comprising any one or more of the methods described herein or perform functions associated with telecommunications described herein FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3$^{rd}$ Generation Partnership Project (3GPP), with information available at www.3gpp.org. In one embodiment, the LTE-EPS network architecture 400 includes an access network 402, a core network 404, e.g., an evolved packet core (EPC) or Common BackBone (CBB) and one or more external networks 406, sometimes referred to as packet data network (PDN) or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as a user endpoint device or user equipment (UE) 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices, Internet of Things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
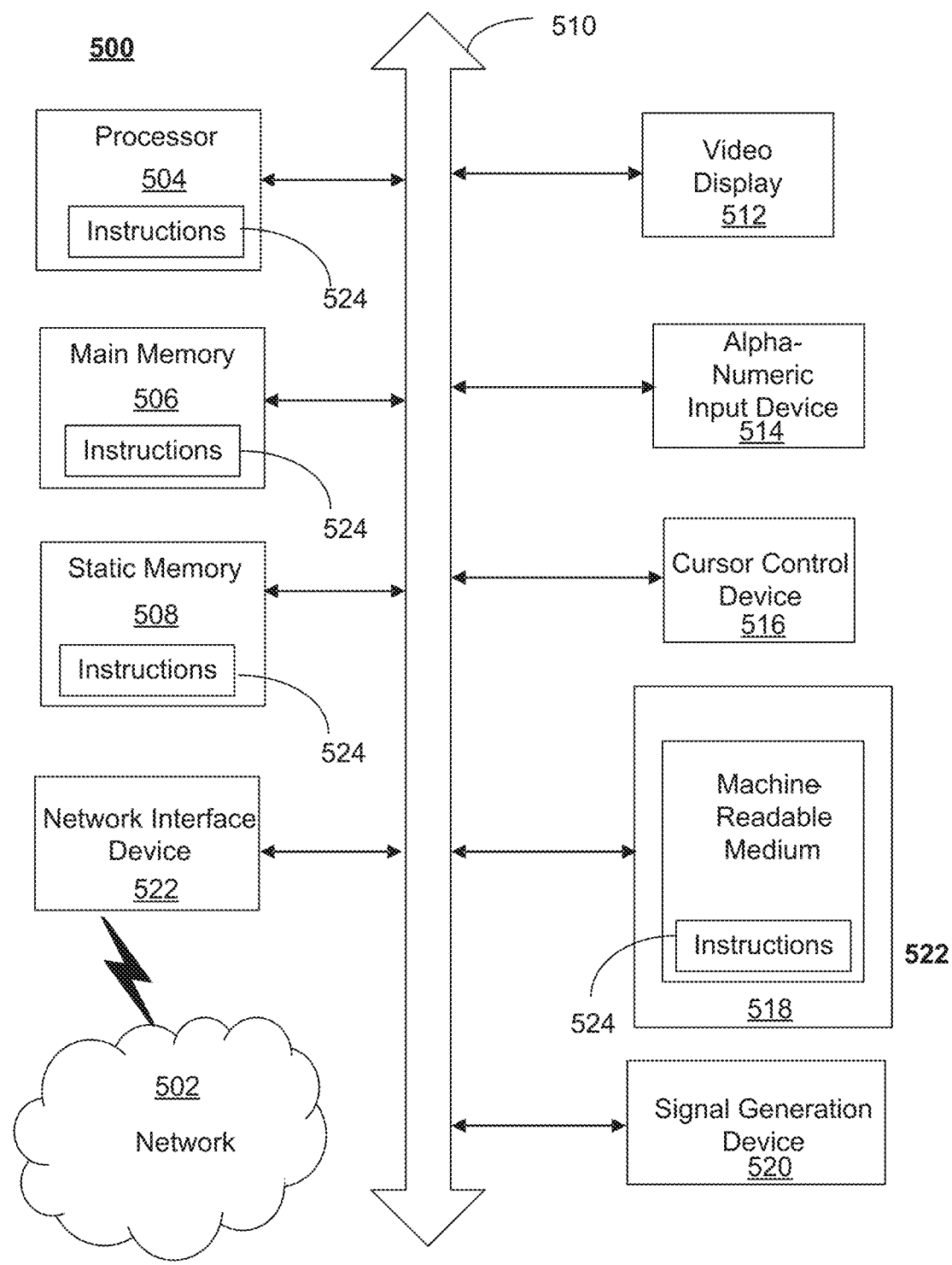
FIG. 5 depicts an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described herein. One or more instances of the machine can operate, for example, as processor 302, UE 414, eNB 416, MME 418, SGW 420, HSS 422, PCRF 424, PGW 426 and other devices of FIGS. 3, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
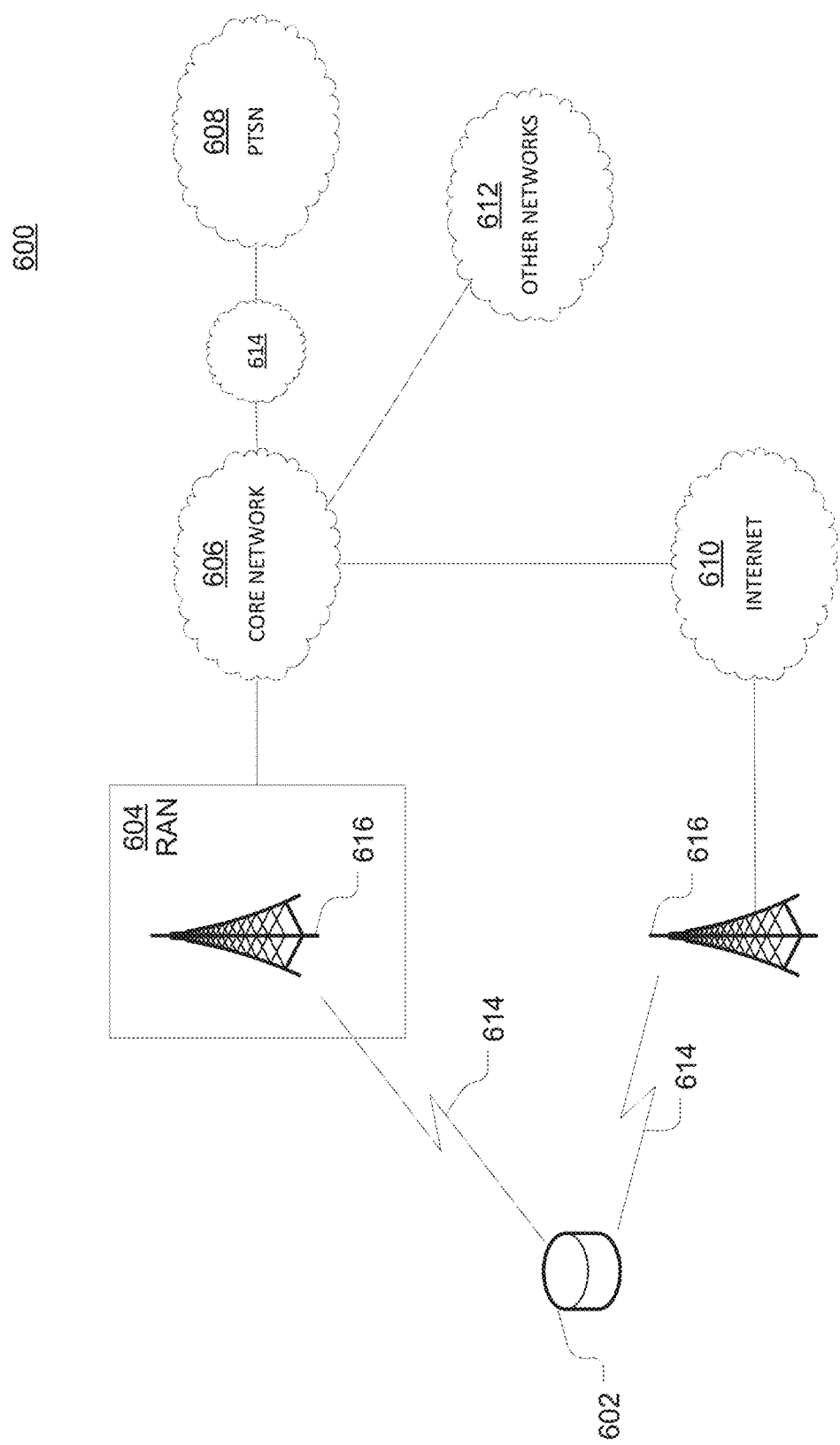
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
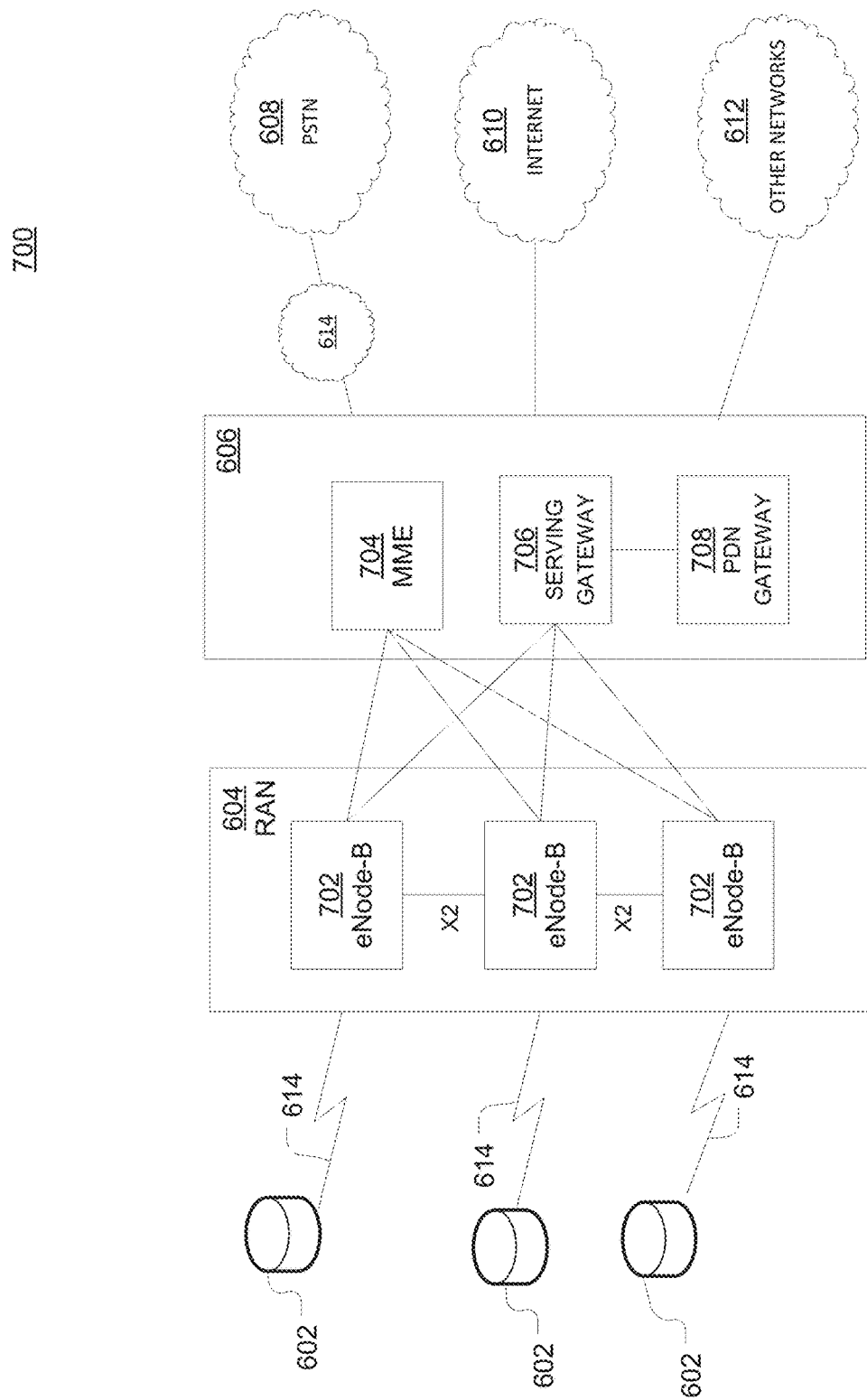
FIG. 7 is an example system diagram of a radio access network (RAN) and a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
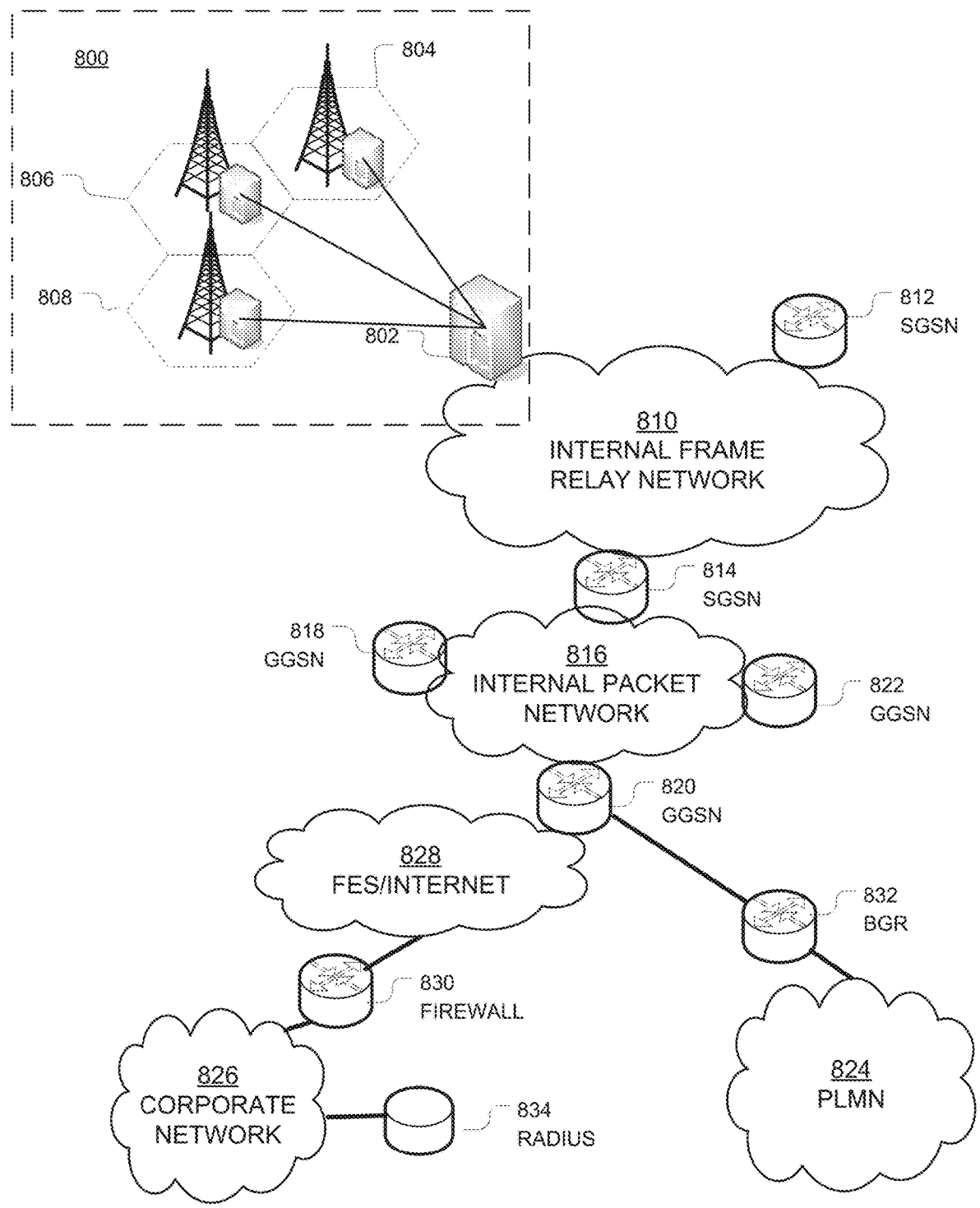
FIG. 8 depicts an overall block diagram of an example packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800

(only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
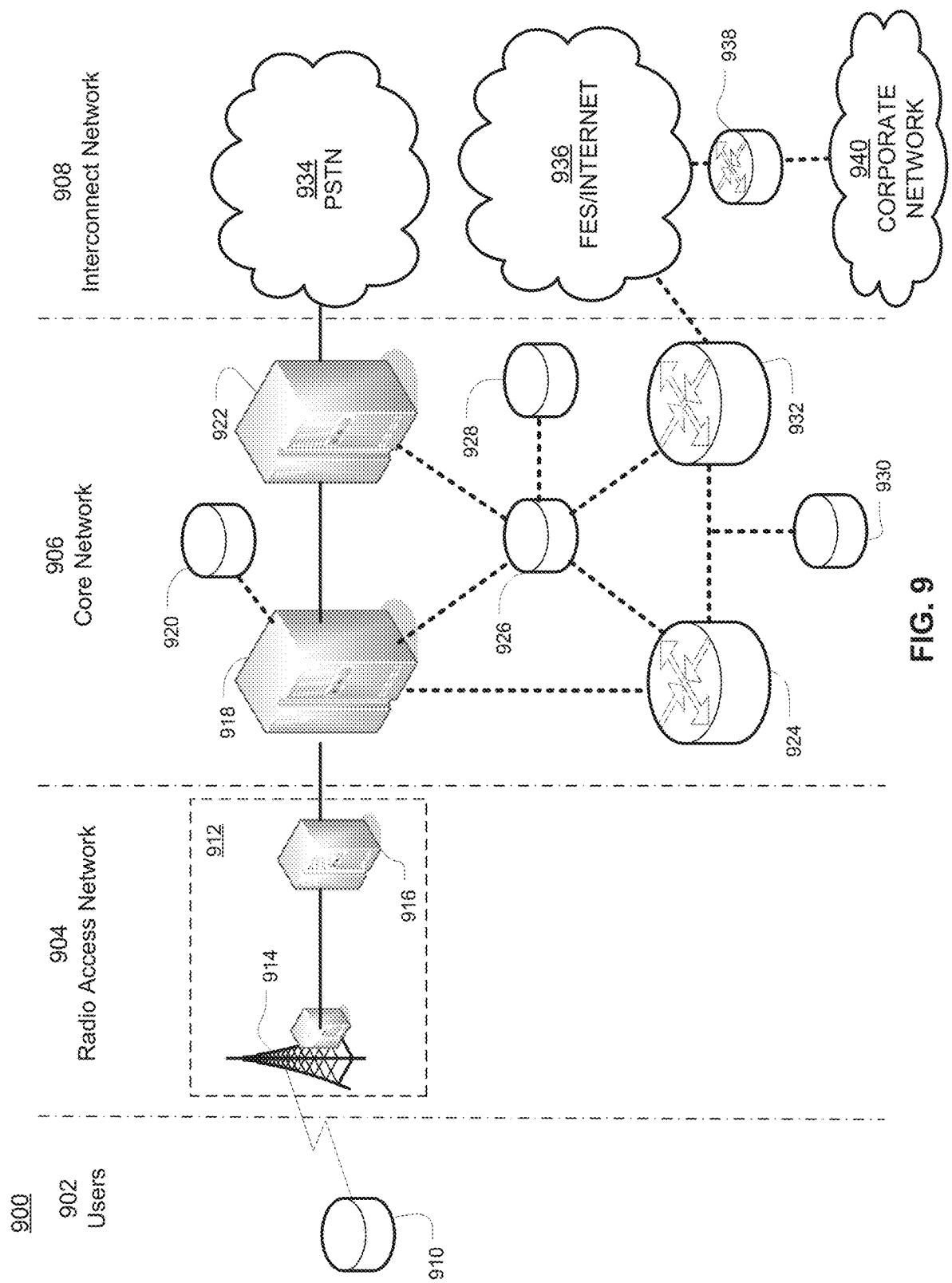
FIG. 9 illustrates an exemplary architecture of a general packet radio service (GPRS) network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., drone 102, network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
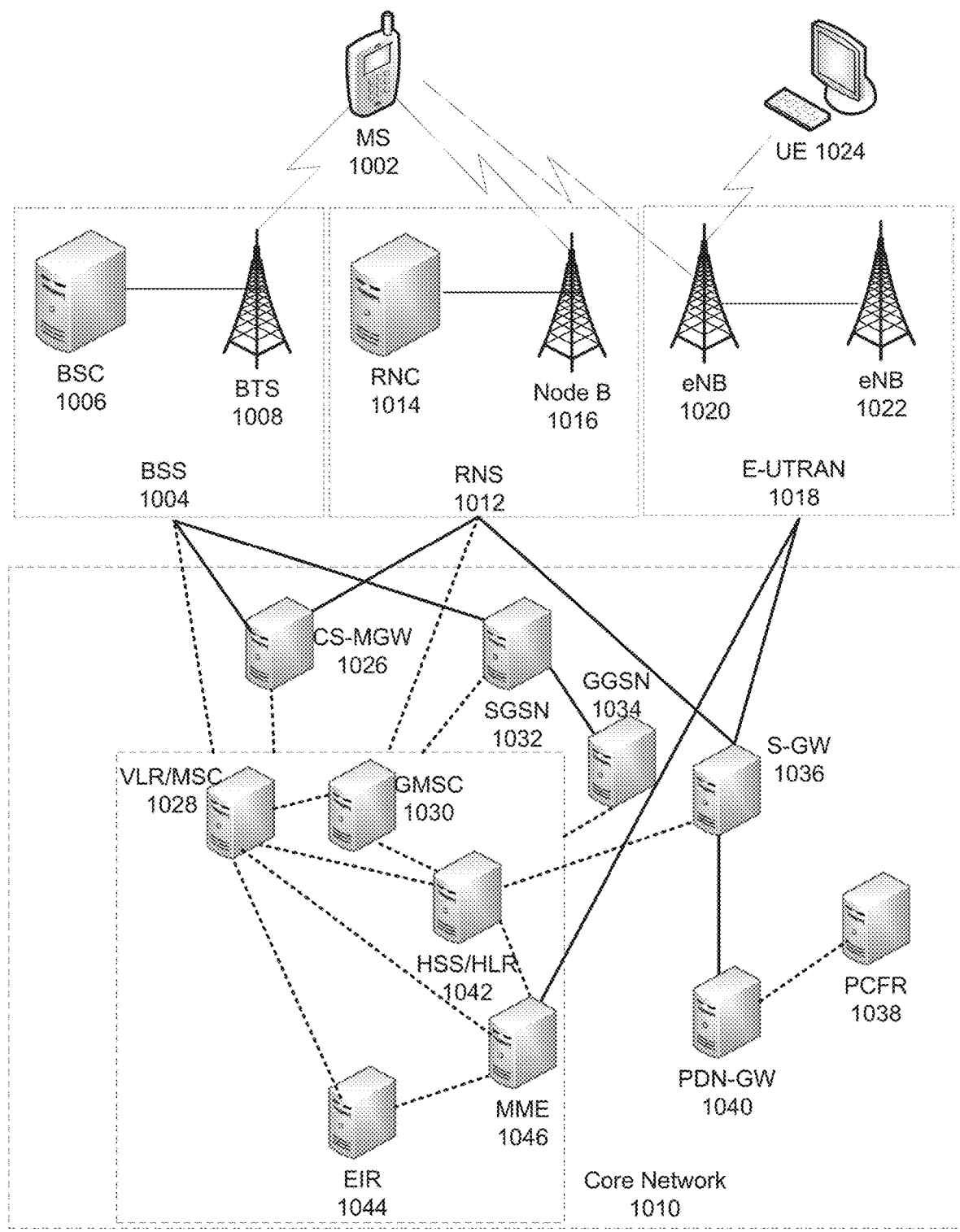
FIG. 10 is a block diagram of an exemplary public land mobile network (PLMN).

FIG. 10 illustrates a PLMN block diagram view of an example architecture of a telecommunications system that may be used by system XXX to implement. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A network device, the network device comprising:
   a processor; and
   a memory coupled with the processor, the memory storing executable instructions that when executed by the processor cause the processor to effectuate operations comprising:
   receiving a message;
   identifying a plurality of application servers based on the message, wherein the message comprises:
   a request for a service; and
   a service chaining order that provides a sequential order or a concurrent order to perform respective parts of the service using the plurality of application servers;
   identifying application server parameters for the plurality of application servers;
   using a lookup table to correlate the application server parameters to one or more network communication parameters;
   modifying the one or more network communication parameters of the message based on the application server parameters for the plurality of application servers;
   causing the network device to manage communications between an Internet of things (IoT) device and the plurality of application servers in accordance with the one or more network communication parameters;
   mapping a hierarchy for the plurality of application servers; and
   based on the mapping, providing instructions for how a device of a network sends messages to each of the respective application servers of the plurality of application servers.

2. The network device of claim 1, wherein the one or more network parameters comprise identification of a network slice.

3. The network device of claim 2, wherein the one or more network communication parameters comprise a response time for a gateway to send the request message to an external network.

4. The network device of claim 1, wherein the application server parameters comprise at least one indication of an Industry Vertical (IV), wherein the IV is healthcare.

5. The network device of claim 1, wherein the application server parameters comprise at least one indication of an Industry Vertical (IV), wherein the IV is home automation.

6. The network device of claim 1, further comprising adding application server parameters for a new application server, deleting application server parameters for an old application server, or modifying application server parameters for an existing application server.

7. The network device of claim 1, wherein the message further comprises an application server message from at least one application server of the plurality of application servers; and
   causing the network to manage communications between the IoT device and the plurality of application servers further comprises sending the application server message via the network to the IoT device.

8. The network device of claim 7, wherein the causing step further comprises associating the application server message with a network slice, wherein the network slice is partition in a network utilizing virtualization.

9. The network device of claim 1, wherein the message further comprises a device message from the IoT device, the device message comprising at least one of an identifier for the IoT device and an identifier for at least one application server of the plurality of application servers.

10. The network device of claim 1, wherein the IoT device comprises one or more household appliances, one or more utility meters, one or more personal fitness trackers, or one or more fully autonomous vehicles.

11. The network device of claim 9, wherein the identifier for the at least one application server comprises a Uniform Resource Locator (URL) or a Port Number.

12. The network device of claim 1, wherein the IoT device comprises one or more fully autonomous vehicles.

13. A system comprising:
   an Internet of things (IoT) device; and
   a network device communicatively connected with the IoT device, the network device comprises:
   a processor; and
   memory storing instructions that cause the processor executing the instructions to effectuate operations, the operations comprising:
      receiving a message;
      identifying a plurality of application servers based on the message, wherein the message comprises:
         a request for a service; and
         a service chaining order that provides a sequential order or a concurrent order to perform respective parts of the service using the plurality of application servers;
      identifying application server parameters for the plurality of application servers;
      using a lookup table to correlate the application server parameters to one or more network communication parameters;
      modifying one or more network communication parameters of the message based on the application server parameters for the plurality of application servers;
      causing the network device to manage communications between the IoT device and the plurality of application servers in accordance with the one or more network communication parameters;
      mapping a hierarchy for the plurality of application servers; and
      based on the mapping, providing instructions for how a device of a network sends messages to each of the respective application servers of the plurality of application servers.

14. The system of claim 13, wherein the application server parameters comprise at least one of Industry Vertical (IV), Class of Service (CoS), and Service Level Agreement (SLA).

15. The system of claim 13, further operations comprising adding application server parameters for a new application server.

16. The system of claim 13, wherein the message further comprises an application server message from at least one application server; and
   the causing the network device to manage communications between the IoT device and the plurality of application servers operation further comprises sending the application server message via the network to the IoT device.

17. The system of claim 16, wherein the causing operation further comprises associating the application server message with a network slice, wherein the network slice is partition in a network utilizing virtualization.

18. The system of claim 13, wherein the message further comprises a device message from the IoT device, the device message comprising at least one of an identifier for the IoT device and an identifier for at least one application server of the plurality of application servers.

19. The system of claim 18, wherein the one or more network communication parameters comprise a priority for the device message; and
   the causing the network device to manage communications between the IoT device and the plurality of application servers operation further comprises sending the device message to the plurality of application servers based on the priority.

20. A computer readable storage medium storing computer executable instructions that when executed by a computing device cause said computing device to effectuate operations comprising:
   receiving a message;
   identifying a plurality of application servers based on the message, wherein the message comprises:
      a request for a service, and
      a service chaining order that provides a sequential order or a concurrent order to perform respective parts of the service using the plurality of application servers;
   identifying application server parameters for the plurality of application servers;
   using a lookup table to correlate the application server parameters to one or more network communication parameters;
   modifying the one or more network communication parameters of the message based on the application server parameters for the plurality of application servers;
   causing the network device to manage communications between an Internet of things (IoT) device and the plurality of application servers in accordance with the one or more network communication parameters;
   mapping a hierarchy for the plurality of application servers; and
   based on the mapping, providing instructions for how a device of a network sends messages to each of the respective application servers of the plurality of application servers.

* * * * *